June 29, 1948.　　　V. R. TRABUCCO　　　2,444,386
FRONT AXLE MOUNTING FOR VEHICLES
Filed June 24, 1946　　　3 Sheets-Sheet 1
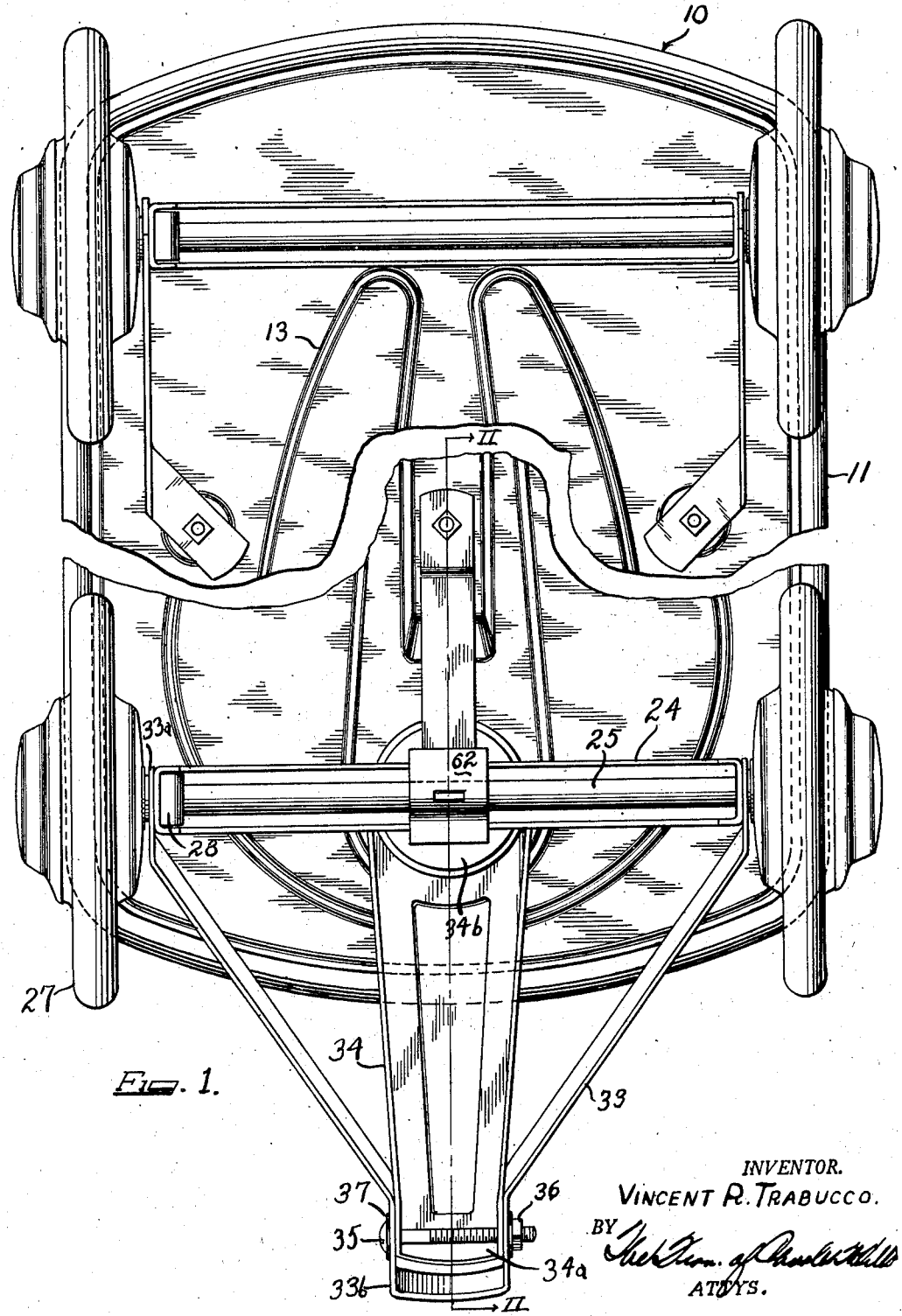
INVENTOR.
VINCENT R. TRABUCCO.
BY
ATTYS.

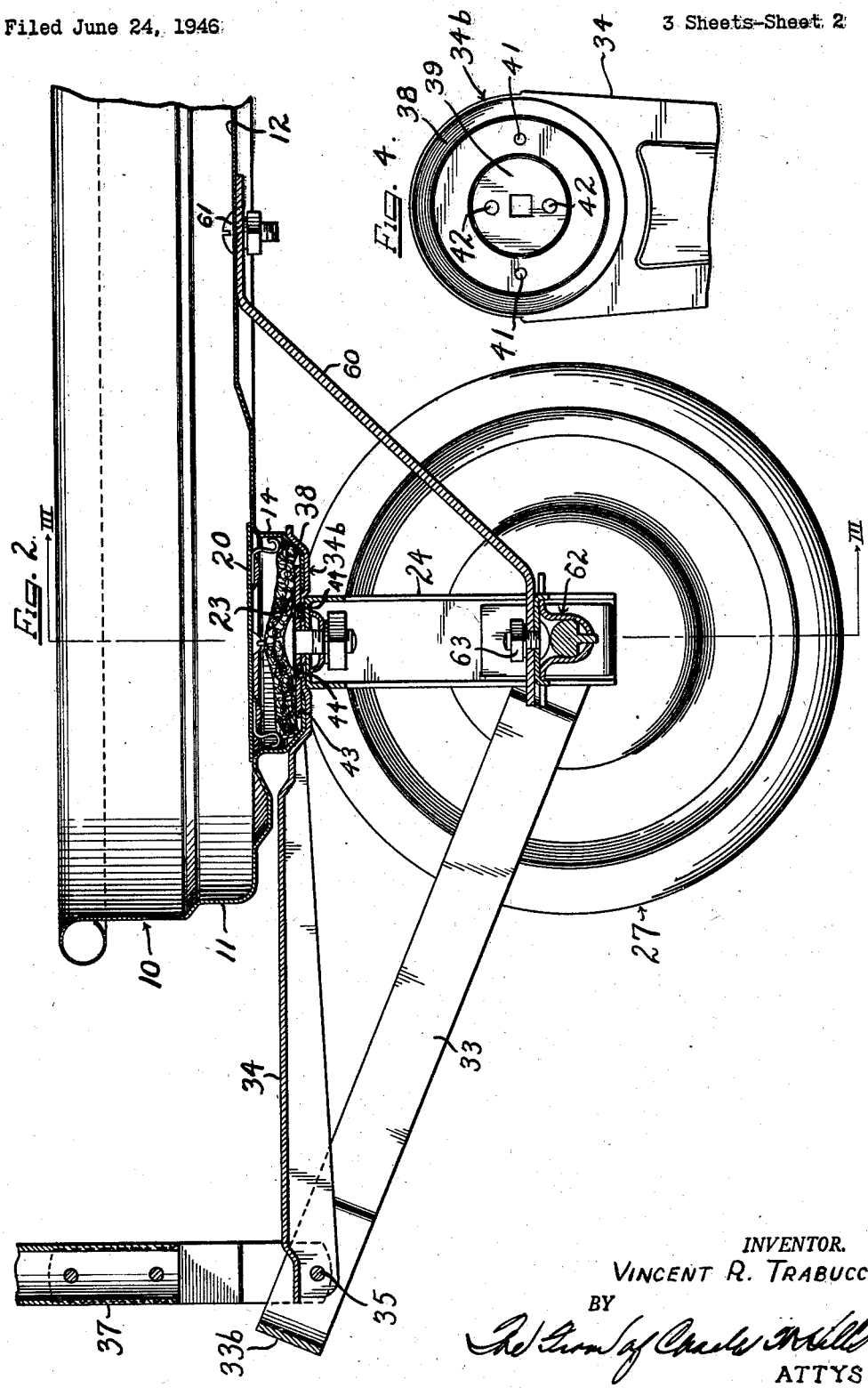

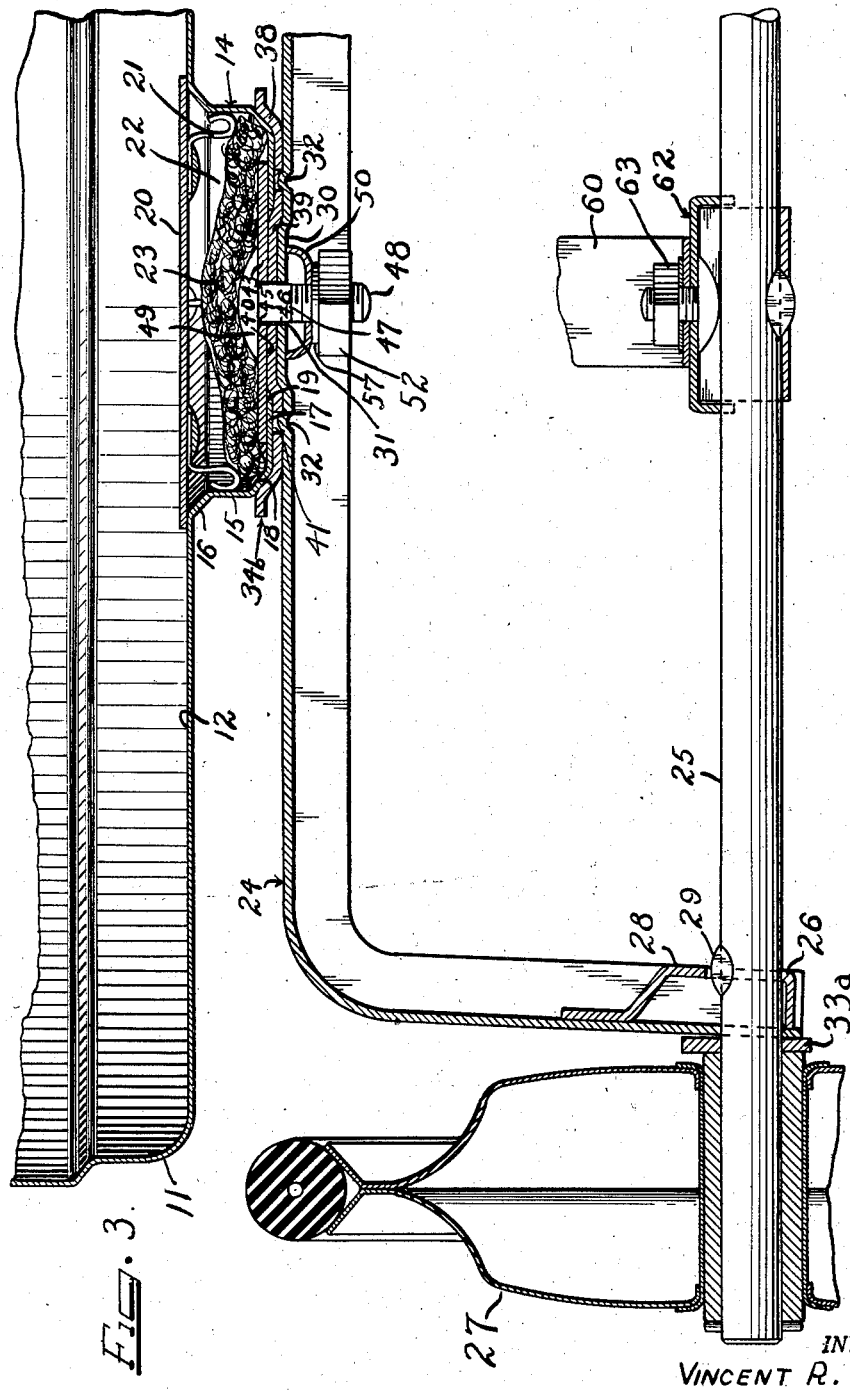

Patented June 29, 1948

2,444,386

UNITED STATES PATENT OFFICE 2,444,386

FRONT AXLE MOUNTING FOR VEHICLES

Vincent R. Trabucco, Steger, Ill., assignor to Steger Products Manufacturing Corporation, Steger, Ill., a corporation of Illinois Application June 24, 1946, Serial No. 678,752

3 Claims. (Cl. 280—87.01)

This invention relates to a vehicle, and more particularly to a vehicle having an improved pivotal mounting for effecting the turning movement of the bolster frame and front axle assembly.

In accordance with my present invention the vehicle body is formed of a material, such as sheet metal, which can be readily stamped to the form and shape desired. In order to provide a pivotal mounting upon which the bolster frame carrying the front axle and wheels can be turned, a portion of the bottom wall of the vehicle body is stamped out to provide a downwardly extending cup-like portion having an enlarged central opening. The rear end portion of the tongue of the vehicle is provided with a cupped portion, as by stamping, that conforms to and serves to receive the cup-like portion for relative turning movement therebetween. The upper surface of the bolster frame provides a base for the rear end portion of the tongue for supporting the same thereon against relative turning movement. A washer overlies the large central opening in the cup-like portion to provide a relatively large radius peripheral surface in swiveling relationship to the underlying surface of the bottom wall of said cup-like portion. A bolt, lower washer and nut serve to hold the parts in their assembled relationship and prevent relative turning movement between the upper washer, the end portion of the tongue and the bolster frame, while permitting relative turning movement between said cup-like portion one the one hand and the upper washer, tongue end portion and bolster frame on the other hand. The cup-like portion serves as a reservoir for lubricants and is closed by a plate having spring fingers for securing the same in place.

By virtue of this construction there is provided both a pocket for a mass of lubricant that will serve to keep the pivotal mounting lubricated over a long period of time, and also an improved pivotal mounting that affords relatively large bearing surfaces for relative turning movement. Since one element of the pivotal mounting is integral with the vehicle body itself, the construction is much stronger and more rugged than in previous designs of pivotal mountings in which a similar element was provided by a separate cup-shaped bracket riveted or otherwise secured to the vehicle body. Because of the relatively long radii of the annular bearing surfaces between which the turning movement takes place, the pivotal mounting is unusually stable and free from any tendency to permit looseness or wobbling between the constituent elements of the mounting.

It is therefore an important object of this invention to provide a novel and improved construction of pivotal mounting for the turning movement of the front bolster frame carrying the front axle and wheels relative to the body of the vehicle, the construction of the pivotal mounting being such as to provide an integral portion of the body of the vehicle as an element of the mounting and also to provide a pocket for perpetual lubrication of the bearing surfaces.

It is a further important object of this invention to provide a pivotal mounting for the front bolster frame of a wheel vehicle wherein an integral portion of the body of the vehicle constitutes an element of the pivotal mounting and is held for relative swiveling movement between other elements of the mounting that are prevented from relative movement as between themselves, and wherein the portion of the vehicle body forming such mounting element also provides a pocket for a source of lubricant for the bearing surfaces of the mounting.

Other and further important objects of this invention will be apparent from the disclosures in the specification and the accompanying drawings.

On the drawings:

Figure 1 is a broken bottom plan view of a vehicle embodying the principles of my invention.

Figure 2 is an enlarged, fragmentary sectional view taken substantially along the line II—II of Figure 1.

Figure 3 is a further enlarged, fragmentary sectional view taken substantially along the line III—III of Figure 2, with parts in elevation.

Figure 4 is a further enlarged, fragmentary bottom plan view of the rear end portion of the tongue forming a part of the pivotal mounting of my invention.

As shown on the drawings:

The reference numeral 10 indicates generally a vehicle embodying the principles of my invention. Said vehicle comprises a body portion 11 which is preferably formed of sheet metal of sufficiently heavy gauge to impart the necessary amount of rigidity to the construction. Said body portion 11 has a bottom wall 12 which is generally flat except for reenforcing ribs 13 (Fig. 1) formed therein and except for a cup-like portion 14 toward the front end of said body portion. Said cup-like portion 14 is formed as an integral part of the bottom wall 12 by a stamping operation. As a result of such stamping operation, the cup-like portion 14 is formed with a downwardly extending cylindrical wall portion 15 that is joined to the bottom wall 12 by a flared connecting portion 16 and that is joined to a flat bottom wall 17 of said stamped portion by a tapered connecting wall portion 18. After the completion of the stamping operation, the bottom wall portion 17 is cut out to provide a relatively large circular opening 19 that is concentric with the cylindrical wall 15 of said cup-like portion 14.

A cover 20 is provided for closing the opening in the bottom wall 12 of the vehicle that is formed by said cup-like portion 14. Said cover 20 may suitably be formed of a disk of sheet metal, to the under side of which are secured a plurality of circumferentially spaced, downwardly extending spring fingers 21. Said spring fingers 21 are outwardly biased for resilient engagement with the inside surface of the cylindrical wall 15 to hold the cover 20 in place. The pocket, indicated at 22, thus provided between the cover 20 and the walls of the cup-like portion 14, serves as a reservoir for a supply of lubricant, which may take the form of lubricant impregnated loose packing 23. Due to the size of the pocket 22, a single charge of packing 23 can be made sufficient to serve as a more or less perpetual source of lubricant for the pivotal mounting hereinafter to be described.

The vehicle 10 includes a front bolster frame 24, suitably formed of channel-shaped metal, the front axle 25 extending through the lower ends 26 of said bolster frame, and wheels 27 mounted for rotation upon the extended ends of said axle. The lower ends 26 of said bolster 24 are reenforced by apertured plates 28 and the axle 25 is provided with feather keys 29 (Fig. 3) for engagement with said plates 28 to prevent relative turning movement of said axle.

The central portion of the horizontal web of said bolster 24 is provided with an upwardly dished circular portion 30. At the center of said circular portion 30 is provided a non-circular opening 31, which is shown as being square. At either side of the raised circular portion 30, the web portion of the bolster 24 is provided with upwardly convex dimples 32 (Fig. 3), which serve a purpose that will later appear.

A yoke 33 extends forwardly from the axle 25, the rear end 33a of said yoke being freely mounted upon said axle between the front wheel and the end 26 of bolster frame. The forward end of the yoke 33 provides a closed loop 33b, into which extends the forward end 34a of a tongue 34 formed of a sheet metal stamping. A bolt 35 passes through the side walls of said looped end 33b of the yoke and through the side walls of the forward end 34a of the tongue 34 and is held in place by a nut 36. A handle 37 is pivotally mounted upon the bolt 35 outside of the looped end 33b of the yoke.

The rear end 34b of the tongue 34 is formed by a stamping operation for association with the upwardly dished portion 30 of the bolster frame 24 and for association with the cup-like portion 14. Said tongue portion 34b as a result of a stamping operation, is formed to a generally circular shape (Fig. 4) with an outer upwardly concave annular portion 38 adapted to conform to and receive the lower wall 17 and tapered connecting wall portions 18 of the cup-like portion 14. Said tongue end 34b is also provided with an upwardly raised, circular central portion 39 adapted to conform with and rest upon the upwardly dished portion 30 of the bolster 24. Said central circular raised portion 39 is of lesser diameter than the large central opening 19 and extends into said opening so that the upper surface 40 of said raised portion 39 lies substantially flush with the upper surface of the bottom wall 17 of said cup-like portion 14. A pair of openings 41 are formed in said tongue end portion 34b for registration with the upwardly convex dimples 32 in the web portion of the bolster frame 24. The tongue end portion 34b is thus held against relative turning movement with respect to said bolster frame 24. In addition, another pair of apertures 42 are provided in the upwardly convex portion 39 of said tongue end 34b in line with the axis of said tongue, the purpose of which apertures will be later explained.

A circular, plate-like washer 43 of larger diameter than the central opening 19 is placed against the bottom wall 17 of said cup-like portion 14 to lie also against the upper surface 40 of the upwardly raised portion 39 of the tongue 34b. Said washer 43 is provided with downwardly convex bumps 44 (Fig. 2) that are adapted to register with and extend into the openings 42 of the tongue end portion 34b and thus hold said washer 43 and tongue end portion 34b against relative turning movement. The washer 43 and tongue end portion 34b are provided with central square openings 45 and 46 (Fig. 3) adapted to register with the square opening 31 in the web of the bolster frame 24 for receiving the squared shank 47 of a step bolt 48. Said bolt 48 has a rounded circular head 49 provided with a flat under face for resting against the upper surface of the washer 43. An upwardly concave washer 50 is inserted upon the lower extended end of said bolt 48 to bear against the under surface of the upwardly dished portion 30 in the web of the bolster frame 24. A lock washer 51 and a nut 52 complete the pivotal mounting assembly, the nut 52 being threaded home upon the lower threaded end of the nut 48 to hold the parts of the mounting in assembled relationship.

When so assembled, the bottom wall 17 of the cup-like portion 14 is held between the upper washer 43 and the upwardly concave annular portion 38 of the tongue end 34b for relative turning movement therebetween. On the other hand, the washer 43, tongue end portion 34b and bolster frame 24 are held against relative turning movement by reason of the inter-engagement between the bumps 44 and holes 42 and the dimples 32 and holes 41. The entire turning movement, therefore, occurs between the contacting surfaces of the lower wall 17 of said cup-like portion 14 and the under surface of the washer 43 and the upper concave surface 38 of the tongue end 34b. The lubricant from the packing 23 will naturally find its way between the relative turning surfaces, due to capillarity and the turning movement that takes place. In this connection, the openings 41 may serve as reservoirs for lubricant finding its way thereinto and thus aid in the lubrication of the relative turning surfaces on the under side of the bottom wall 17 of the cup-like portion 14.

Owing to the rather extensive area of contact between the bearing surfaces of the pivotal mounting and also owing to the fact that the bearing load is distributed over annular surfaces rather than about a central restricted bearing surface, the pivotal mounting is exceptionally stable against forces tending to separate the constituent elements of the mounting. Also, since the cup-like portion 14 is an integral part of the bottom wall 12 of the vehicle body 11, said cup-like portion 14 has the full strength and rigidity that the metal of said bottom wall 12 provides. This results in an exceptionally strong and sturdy pivotal mounting for the vehicle.

As is usual in constructions of the type here under consideration, a bracket or strap 60 extends from the bottom wall 12 of the vehicle, to which it is affixed by means of a bolt and nut assembly 61, to a lower front axle assembly, indicated as a whole by the reference numeral 62, to which it is affixed by means of a bolt and nut assembly 63. The rear end of the yoke 33 forms a part of said assembly 62. Since the construction of said assembly is described and claimed in my copending application Serial No. 599,715, filed June 15, 1945, now Patent No. 2,420,847, dated May 20, 1947, no further description thereof is here necessary.

It will, of course, be understood that various details of construction may be varied through a wide range without departing from the principles of this invention and it is, therefore, not the purpose to limit the patent granted herein otherwise than necessitated by the scope of the appended claims.

What I claim is:

1. In a wheeled vehicle including a body, a front axle, wheels on said axle and a bolster frame carrying said axle and wheels for turning movement with respect to said body, an improved pivotal mounting for effecting said turning movement comprising a downwardly extending cup-like portion formed in the bottom of said body and provided with a large circular opening, an upwardly dished circular portion formed on said bolster frame of lesser diameter than said circular opening, a tongue having an end portion cupped to conform to and receive said cup-like portion and having an upwardly raised circular portion extending into said large circular opening and nesting with said upwardly dished circular portion, a washer overlying the bottom of said cup-like portion, said washer, tongue end portion and upwardly dished portion having registering non-circular openings and having cooperating elements preventing relative rotation, fastening means extending through said non-circular openings to hold said washer, cup-like portion, tongue end portion and upwardly dished bolster portion in assembled relation while permitting relative turning movement between said cup-like portion and the adjacent surfaces of said washer and tongue end portion, said cup-like portion providing a reservoir for a supply of lubricant for said relative turning surfaces, and a cover for said reservoir removably secured in said cup-like portion and forming a continuation of the bottom of said body.

2. In a wheeled vehicle including a sheet metal body, a front axle, wheels on said axle and a bolster frame carrying said axle and wheels for turning movement with respect to said body, an improved, pivotal mounting for effecting said turning movement comprising a downwardly extending cup-like portion integrally stamped from the bottom of said body and provided with a large circular opening, an upwardly dished circular portion formed on said bolster frame of lesser diameter than said circular opening, a tongue having an end portion cupped to conform to and receive said cup-like portion and having an upwardly raised circular portion extending into said large circular opening to provide a plane surface flush with the upper surface of the bottom wall of said cup-like portion, said upwardly raised circular portion nesting with said upwardly dished circular portion, a washer resting against said plane surface and overlying the bottom of said cup-like portion, said washer, tongue end portion and upwardly dished portion having registering non-circular openings and having cooperating elements preventing relative rotation, and fastening means extending through said non-circular openings to hold said washer, cup-like portion, tongue end portion and upwardly dished bolster portion in assembled relation while permitting relative turning movement between said cup-like portion and the adjacent surfaces of said washer and tongue end portion, said cup-like portion being adapted to contain a supply of lubricant for lubricating the bearing surfaces for said relative turning movement, and a disk-like cover resting on the rim of said cup-like portion, said cover having depending spring fingers resiliently engaging the side walls of said cup-like portion to retain said cover thereon.

3. In a wheeled vehicle including a sheet metal body, a pair of front wheels and a bolster frame carrying said front wheels for turning movement with respect to said body, the improvements of a downwardly extending cup-like portion integrally stamped from the bottom of said body, bearing means disposed within said cup-like portion for pivotally supporting said body on said bolster, said cup-like portion being adapted to contain a supply of lubricant surrounding said bearing means, and a disk-like cap secured across the top of said cup-like portion to enclose a lubricant therein and form a continuation of said bottom of the body.

VINCENT R. TRABUCCO.